Sept. 13, 1955

S. W. RIPLEY 2,717,847

MACHINES FOR LAPPING STRIPS OF MATERIAL ON
ELECTRIC CONDUCTORS AND OTHER ARTICLES

Filed March 26, 1954

Inventor
S. W. Ripley
By
Webb Mackey & Burden
Attorney

Sept. 13, 1955 S. W. RIPLEY 2,717,847
MACHINES FOR LAPPING STRIPS OF MATERIAL ON
ELECTRIC CONDUCTORS AND OTHER ARTICLES
Filed March 26, 1954 3 Sheets-Sheet 3

Inventor
S. W. Ripley
By
Webb Mackey & Burden
Attorney

United States Patent Office 2,717,847
Patented Sept. 13, 1955

2,717,847

MACHINES FOR LAPPING STRIPS OF MATERIAL ON ELECTRIC CONDUCTORS AND OTHER ARTICLES

Stanley Warwick Ripley, Gravesend, England, assignor to British Insulated Callender's Cables Limited, London, England, a British company Application March 26, 1954, Serial No. 418,929

Claims priority, application Great Britain May 13, 1953

7 Claims. (Cl. 154—2.27)

This invention relates to machines by which a number of strips of paper or other material are applied as superimposed helical lappings simultaneously to an electric conductor or other long article (hereinafter included in the term "conductor") to build up the required thickness of covering. Such a machine comprises one or more (frequently a large number) heads each carrying a set of flat spiral coils of strip material arranged in a group about the axis of the machine along which the conductor travels while the lapping is performed by the rotation of the head. From each of the coils a strip is led off over a guide to meet the conductor at an appropriate angle and in the appropriate relation to adjacent strips. This relation depends on the width of the strips and the spacing between their edges and whenever the width of strip or the spacing is changed it is necessary to adjust the relative position of all the guides for the group of strips carried by a head. One guide, however, may remain fixed and all the others be adjusted relative to it.

The adjustment needed is a longitudinal displacement of the guide, that is a movement parallel to the axis of the machine. The guides of a group associated with a head are mounted on supports which usually have equiangular spacing about the axis of the machine although this is not necessary. Each guide may be a roller in a suitable carrier, or a member having a smooth surface over which the strip slides. The adjustment required for each guide is a movement through a distance which is different for each guide. If the guides are spaced equiangularly about the axis, these distances form an arithmetical progression.

Such a machine is referred to hereinafter as a machine of the kind described.

In an existing machine the adjustment of the guides requires that separate attention should be given to each guide (or to all but one of them) and the adjustment of a group is a long process requiring skill and careful manipulation.

The present invention provides an improved arrangement of the guides by which the adjustments needed for all the guides for a head are brought about simultaneously and in the correct relative proportions so that a single measurement or indication establishes that the correct adjustment of the group has been attained.

In accordance with the invention the longitudinal adjustment of such a group of guides is brought about by a single member, which may be adjusted by hand, and which is connected by gearing to the support for each guide to be moved in such a way as to move these simultaneously and drive each of these guides through a gearing having a ratio different from those of the others. This ratio is chosen in dependence on the angular position of the guides. One of the guides may be arranged so that it receives no adjustment, while the others are adjusted to extents increasing with their angular separation from this fixed guide.

In practice there will generally be only a limited range of variation of strip width and spacing required for a given machine and in such cases it will only be necessary to provide the controlled simultaneous adjustment for this range. The supports for the guides may be constructed or set so as to give initial placings of the guides in different longitudinal positions, this placing being correct for the shortest lay of the strip which is to be employed. This initial placing may be independent of the gearing and may provide the starting points from which the controlled simultaneous adjustment takes place. This adjustment need not be purely longitudinal but must obtain a principal longitudinal component.

A convenient form of gearing is one in which each guide to be moved is driven by a screw-threaded spindle and a nut working thereon, the spindles having threads of different pitches and the spindles and nuts being subjected by a common drive to relative rotation of the same angular extent, whereby all the movable guides are adjusted simultaneously and each guide receives the required amount of longitudinal adjustment.

The invention will be described further with the aid of the accompanying drawings, illustrating one form of construction, by way of example, and wherein.

Figure 1:
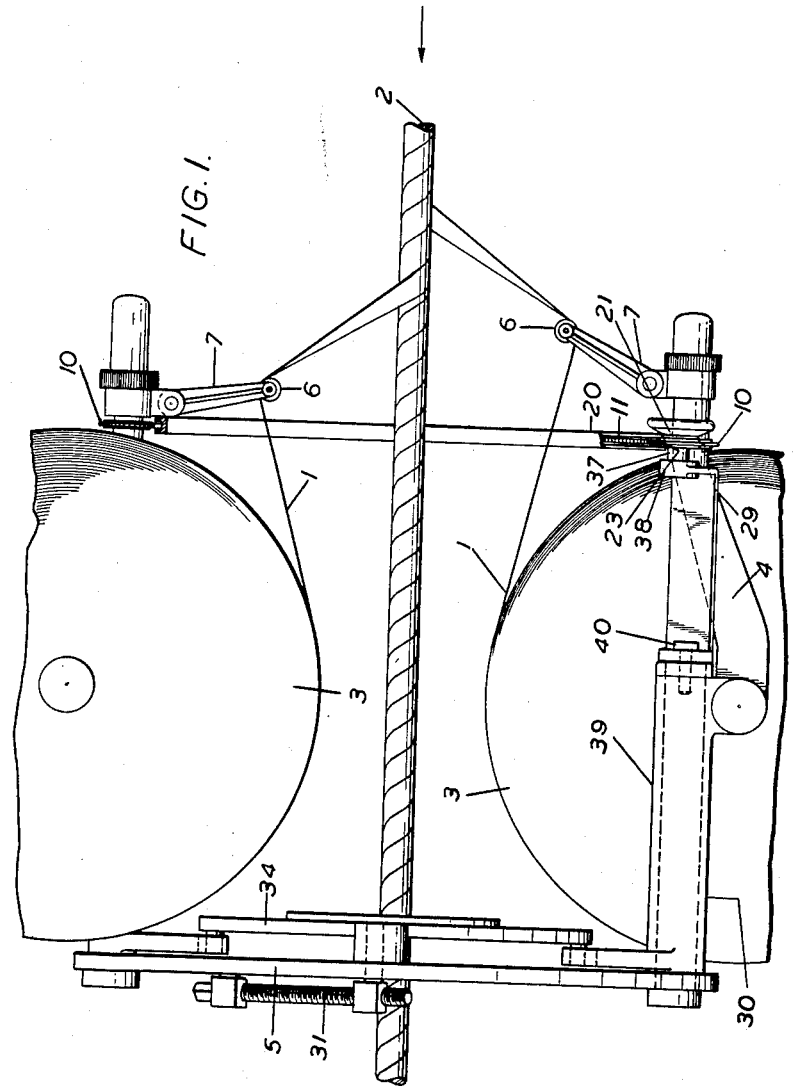
Figure 1 is a side elevation.

The machine illustrated is capable of applying simultaneously six strips of paper or other material to an elongated cylindrical body moving axially through the head of the machine. For convenience of description it will be assumed that the strips indicated by the reference numerals 1, are of paper and the cylindrical body shown at 2 is an electric conductor. Each strip 1 is drawn off from a flat coil 3 mounted on a bracket 4 attached to a vertically disposed plate 5, and is led over a guide roller 6 on to the conductor 2. The six strips 1 are applied simultaneously to the conductor to form superimposed layers for the purpose of providing the conductor with a body of insulation of the required thickness of wall. Each guide roller 6 is mounted for free rotation at the radially inner end of a forked bracket 7 and the guide rollers are spaced equiangularly about the longitudinal axis of the machine. Each strip is led tangentially on to the conductor 2 by its roller guide and it is assumed that all the guides but one are to be adjusted in a direction parallel with the longitudinal axis of the machine. Between the guide roller and the conductor 2 each strip is twisted through a right angle.

Figures 3, 4:
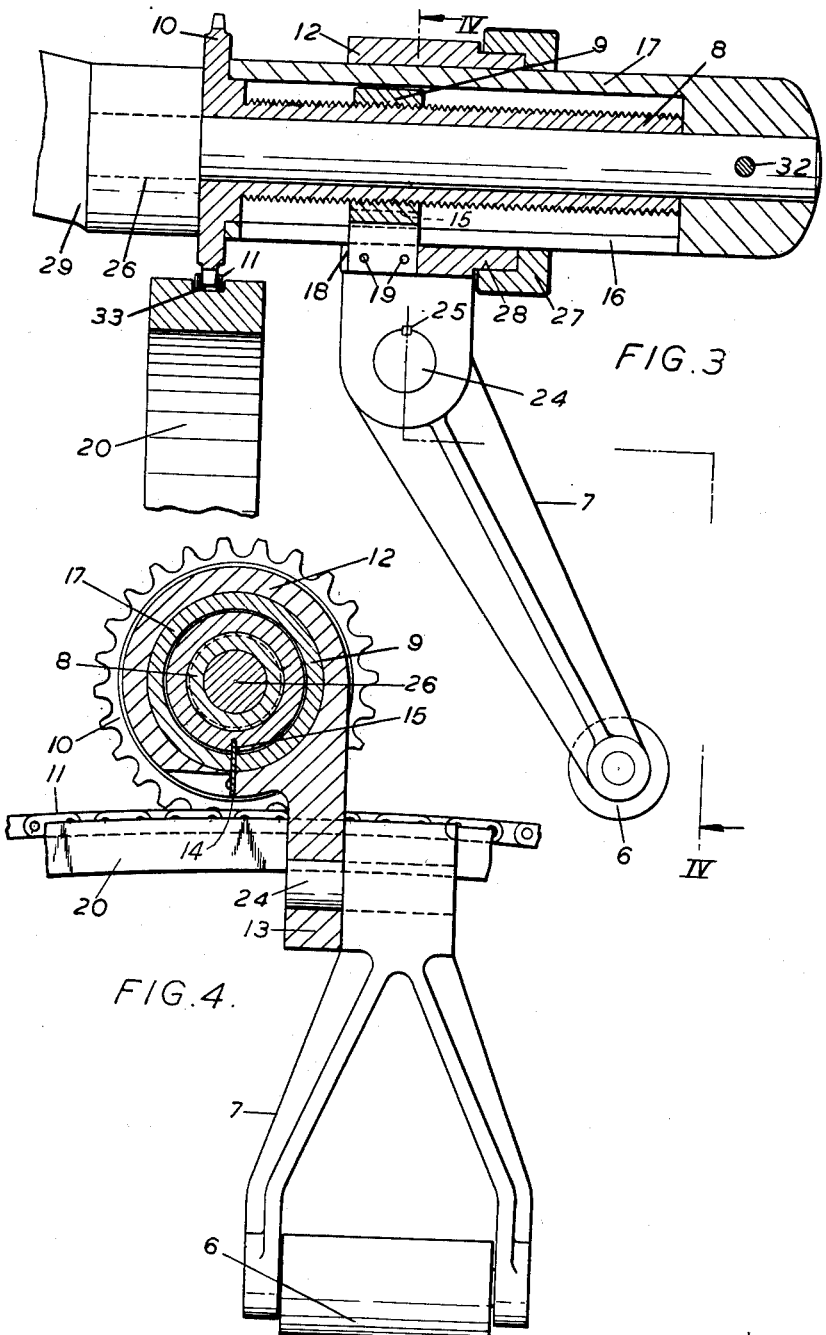
Figure 3 is a fragmentary part sectional side elevation drawn to a larger scale and Figure 4 is a fragmentary part sectional end elevation also drawn to a larger scale and taken on the line IV—IV of Figure 3 and looking in the direction of the arrows.

All the adjustable guide rollers 6 are adapted to be moved simultaneously in a direction parallel with the axis of the machine and for that purpose each of such guides is provided with its own driving mechanism and all of those driving mechanisms are operated by a single driving member. Referring to Figures 3 and 4, each of such driving mechanisms comprises a rotatably mounted externally threaded spindle 8 and a nut 9 working thereon. The spindle is prevented from axial movement so that when rotated the nut moves longitudinally of the spindle. Each of the latter has at one end a sprocket 10 and all the sprockets are driven by a single driving roller chain 11.

Each of the nuts 9 is connected to a cylindrical sleeve 12 provided with a tangentially projecting portion 13 to which the corresponding forked bracket 7 is attached. The connection between each nut and its sleeve 12 is effected by a blade-like member 14 made, for example, of steel, which enters a slot 15 formed in the outer part of the nut 9. The member 14 extends through a long narrow slot 16 formed in the wall of a casing 17 and is attached to a flat face 18 forming part of the sleeve 12 by rivets 19. As will be understood, the roller chain 11 drives all the sprockets 10 simultaneously so that all the spindles 8 are rotated and the nuts 9 thereon moved longitudinally and simultaneously thereby imparting longitudinal movements to the guide rollers 6. As explained above, when it is required to change the width of the paper or the distance between the edges of adjacent convolutions in a layer, it is necessary to adjust all the guides in a direction parallel with the longitudinal axis of the machine. If, for example, narrow strips of paper have been applied to the conductor and it then becomes necessary to apply over the narrower strips, strips which are of greater width, with the spacing between the edges of adjacent convolutions, however, remaining the same as for the narrower strips, an adjustment of all but one of the guide rollers is required. The extent of movement which it is necessary to give to each guide roller from its previous position will vary according to the amount of increase in width of the strip and also according to the angular position of the guide roller concerned. In paper lapping machines for conductors the guides are generally spaced equiangularly for mechanical reasons and in such cases, the displacements required for the adjustable guides form an arithmetical progression. In the construction being described this simultaneous adjustment of the guide rollers through predetermined displacements of varying extent are obtained by giving to the thread of each spindle 8, pitches which are different for each spindle, the relationship between the pitches being such as to give the required relationship of the displacements of the adjustable guide rollers. As the sprockets 10 are all turned together by the roller chain 11, the nuts 9 and therewith the guide rollers 6 are moved longitudinally through different distances, the relationship of which is appropriate for the displacements required.

Figure 2:
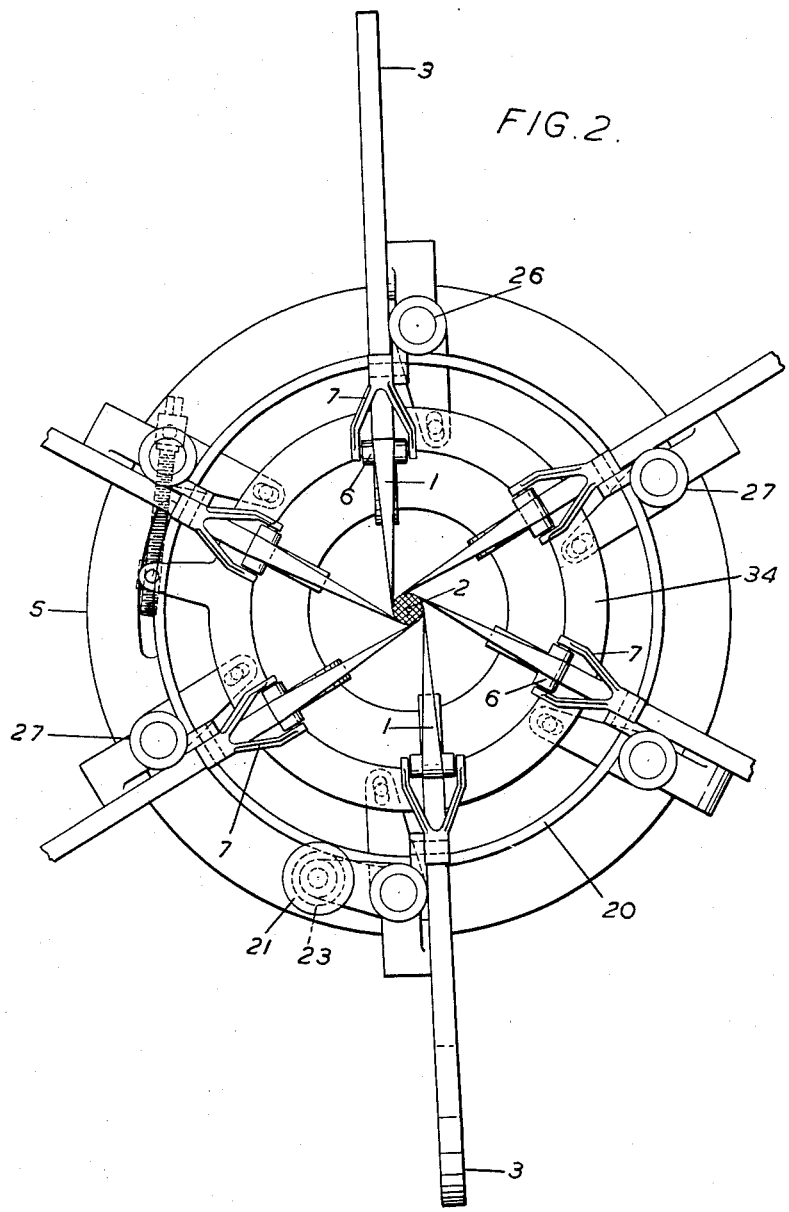
Figure 2 is an end elevation looking in the direction of the arrow shown in Figure 1.

As the strips are being applied simultaneously to the conductor it follows that the roller guides will be longitudinally spaced in relation to the conductor and that therefore, one roller guide will be nearer to the head of the machine, that is to say, nearer to the vertical plate 5 (Figures 1 and 2) than all the others. Although all the guides may be adjustable, it is assumed, as indicated above, that one guide roller remains fixed and the remaining guide rollers are simultaneously adjustable. The guide roller nearest to the head of the machine may be made non-adjustable and the remaining guide rollers be adjustable in relation to the non-adjustable roller.

The driving chain 11 for the sprockets 10 is supported by a ring 20 provided with a circumferential groove 33, the chain resting upon the bottom of the groove. The ring may be of metal or wood, for example, and is disposed between the sprockets with its axis coinciding with the longitudinal axis of the machine. The driving chain 11 is adapted to be adjusted by a rotatable handwheel 21 carrying a sprocket 23 which engages the chain. The handwheel has a spindle 37 supported by a bracket 38 attached to a spindle 39 by a set screw 40. The ring 20 may or may not be prevented from rotation. The spindle 39 is attached to the plate 5.

Instead of mounting the driving chain 11 between the sprockets 10, it may pass over them and be adjusted by a handwheel.

When the machine is running, the sprockets 10 and the handwheel 21 with its sprocket 23 are carried bodily around the longitudinal axis of the machine and the driving chain 11 is caused to travel around that axis, without relative movement between the sprockets and the driving chain or between the latter and the sprocket 23.

In order to provide each adjustable guide roller 6 with a predetermined reference or starting position from which simultaneous adjustment may be subsequently effected, the forked brackets 7 carrying the guide rollers are adapted to be swung each in a vertical plane about the axes of spindles 24. This arrangement enables each guide roller to be given an initial position which is correct for the shortest lay of strip to be used. When making this initial setting the sleeves 12 which carry the adjustable guide rollers are all in the same positions longitudinally. After the guide rollers have thus been given individually their initial or setting positions, the brackets 7 are locked in those positions to the extensions 13 of the sleeves 12 by keys 25 and remain subsequently undisturbed. The simultaneous adjustment of the guide rollers will then be effected subsequently by operating the handwheel 21 to move each adjustable guide roller 6 through the correct distance required for a change in the width of the paper or in the spacing between the edges of adjacent convolutions to be used.

The casings 17 house the threaded spindles 8 and their nuts 9 and are fixed at their outer ends to cylindrical rods or bars 26 by pins 32. The casings 17 support the sleeves 12 which may be locked in position after an adjustment has been made by collar 27 slidable longitudinally of the casing and having an eccentric inner surface 28 for engaging over the outer end of the sleeve. The locking of the collar to the sleeve also serves to take up play between the threaded spindles 8 and their nuts 9 and so produce greater accuracy of setting.

The sprockets 10 are made integral with the threaded spindles 8 and the latter are rotatably mounted on the rods 26 which at their inner ends are fixed to bars 29. The sprockets 10 are mounted on the rods 26 between the adjacent ends of the bars 29 and of the casings 17. The bars 29 each form part of a support 30 for a flat pad 3. Each support is attached to the plate 5 of the machine and all the supports are adapted to be turned simultaneously by the operation of a single screw 31. When this screw is turned a ring 34 connected to all the supports 30 is also turned. This adjustment enables the places at which the strips meet the conductor to be adjusted according to the diameter of the conductor. This part of the mechanism, however, is well known and will not be described in greater detail.

As indicated above, so far as paper lapping machines for conductors are concerned, the variations of strip width and spacing for a given machine required are limited so that it is only necessary to provide for a simultaneous adjustment between the required limits.

To enable the handwheel to be adjusted for a given width of strip or spacing, it may be provided with markings which correspond to the various widths and spacings to be used.

Where one of the guide rollers is not adjustable, apart from the initial setting, it may have a sprocket similar to those shown at 10, for purposes of symmetry, but have no threaded spindle 8 associated with it.

The simultaneous adjustment can be effected quickly and accurately by a simple form of gearing which can be so disposed as not to be disturbed by the effects of centrifugal forces set up when the machine is in operation.

The spindles upon which the nuts are mounted may be made relatively short, thereby facilitating access to the strips.

What I claim as my invention is:

1. A machine for applying strips of material as superimposed helical lappings simultaneously to an electric conductor or other long article, comprising a group of guides for the strips spaced around the axis of the machine and at least some of which guides are longitudinally adjustable parallel with that axis, means for carrying all the guides of the group around that axis, a driving mechanism for each longitudinally adjustable guide, the gear ratios of the driving mechanisms for the guides increasing in a direction circumferentially of the machine, and a single driving member for all the driving mechanisms.

2. A machine for applying strips as superimposed helical lappings simultaneously to an electric conductor or other long article, comprising a group of guides for the strips spaced around the axis of the machine and at least some of which guides are longitudinally adjustable parallel with the said axis, means for carrying all the guides of the group around the said axis, a driving mechanism for each adjustable guide comprising a nut and a screw-threaded spindle engaged by the nut, the spindles having threads, the pitches of which are different from each other, the gear ratios of the driving mechanisms for the guides increasing in a direction circumferentially of the machine, and a single driving member for all the driving mechanisms.

3. A machine for applying strips as superimposed helical lappings simultaneously to an electric conductor or other long article, comprising a group of guides for the strips spaced around the axis of the machine and at least some of which guides are longitudinally adjustable parallel with the said axis, means for carrying all the guides around the machine axis, a driving mechanism for each longitudinally adjustable guide, the said driving mechanisms having gear ratios which are different from each other and being dependent upon the angular positions of the guides, a ring having its axis coincident with that of the machine axis and a single driving member for all the driving mechanisms, supported by the said ring.

4. A machine for applying strips as superimposed helical lappings simultaneously to an electric conductor or other long article, comprising a group of guides for the strips spaced around the axis of the machine and at least some of which guides are longitudinally adjustable parallel with the said axis, a driving mechanism for each longitudinally adjustable guide, the said driving mechanisms having gear ratios which are different from each other and increase in a direction circumferentially of the machine, a sprocket associated with each of such driving mechanisms and a single driving chain surrounding all of said sprockets, and means for carrying all the guides around the axis of the machine.

5. A machine for applying strips as superimposed helical lappings simultaneously to an electric conductor or other long article, comprising a group of guides for the strips spaced around the axis of the machine and at least some of which guides are longitudinally adjustable parallel with said axis, a driving mechanism for each longitudinally adjustable guide, the said driving mechanisms having gear ratios which are different from each other and increase in a direction circumferentially of the machine, a single driving member for all of the driving mechanisms and means, independent of the simultaneous adjustment, for setting the positions of all the guides and means for carrying all the guides around the axis of the machine.

6. A machine for applying strips as superimposed helical lappings simultaneously to an electric conductor or other long article, comprising a group of guides for the strips spaced around the axis of the machine and at least some of which guides are longitudinally adjustable parallel with said axis, a driving mechanism for each longitudinally adjustable guide, the said driving mechanisms having gear ratios which differ from each other and increase in a direction circumferentially of the machine, a single driving member for all the guides, each of said driving mechanisms comprising a longitudinally movable member, casings housing said longitudinally movable members, guide supports attached to the latter and carried by the casings, and means for carrying all the guides around the axis of the machine.

7. A machine for applying strips as superimposed helical lappings simultaneously to an electric conductor or other long article, comprising a group of guides for the strips spaced around the machine axis and at least some of which guides are longitudinally adjustable parallel with the said axis, means for carrying all the guides around the said axis, a driving mechanism for each longitudinally adjustable guide, the said driving mechanisms having gear ratios which differ from each other and increase in a direction circumferentially of the machine, a single driving member for all the driving mechanisms, each of said driving mechanisms including a longitudinally movable member, a casing for each longitudinally movable member, a guide support attached to each longitudinally movable member and carried by the casing and a member also carried by the casing for locking the guide support.

References Cited in the file of this patent

FOREIGN PATENTS

| | | |
|---|---|---|
| 267,091 | Great Britain | of 1927 |
| 274,992 | Great Britain | of 1927 |